United States Patent [19]

Sasaki

[11] Patent Number: 5,701,247
[45] Date of Patent: Dec. 23, 1997

[54] INTEGRATED CONTROL SYSTEM FOR 4WD VEHICLES FOR CONTROLLING DRIVING TORQUE DISTRIBUTION

[75] Inventor: Hiroki Sasaki, Yokohama, Japan

[73] Assignee: Nissan Motor Co., Ltd., Kanagawa, Japan

[21] Appl. No.: 462,461

[22] Filed: Jun. 5, 1995

[30] Foreign Application Priority Data

Jun. 17, 1994 [JP] Japan ................... 6-135427

[51] Int. Cl.⁶ .................................. B60K 23/08
[52] U.S. Cl. .................. 364/424.098; 364/426.035; 364/426.036; 180/197; 180/248
[58] Field of Search .............. 364/424.05, 424.1, 364/426.01, 426.02, 426.03, 424.098, 426.027, 426.034, 426.035, 426.036; 180/197, 233, 248, 249, 245, 246

[56] References Cited

U.S. PATENT DOCUMENTS

| | | | |
|---|---|---|---|
| 4,966,249 | 10/1990 | Imaseki | 180/233 |
| 4,966,250 | 10/1990 | Imaseki | 180/233 |
| 4,981,190 | 1/1991 | Nakayama et al. | 180/197 |
| 5,002,147 | 3/1991 | Tezuka et al. | 180/197 |
| 5,004,064 | 4/1991 | Tezuka et al. | 180/197 |
| 5,041,978 | 8/1991 | Nakayama et al. | 364/426.03 |
| 5,069,305 | 12/1991 | Kobayashi | 180/249 |
| 5,168,953 | 12/1992 | Naito | 180/197 |
| 5,225,984 | 7/1993 | Nakayama | 364/424.05 |
| 5,251,719 | 10/1993 | Eto et al. | 180/197 |
| 5,265,020 | 11/1993 | Nakayama | 364/424.05 |
| 5,396,421 | 3/1995 | Niikura et al. | 364/424.1 |

FOREIGN PATENT DOCUMENTS 62-292529  12/1987  Japan.
5-194462   8/1993   Japan.

*Primary Examiner*—Collin W. Park
*Attorney, Agent, or Firm*—Lowe, Price, LeBlanc & Becker

[57] ABSTRACT

A driving-torque distribution integrated control system for a four-wheel drive vehicle, for controlling a driving torque distribution between front and rear wheels and a driving torque distribution between right and left wheels, comprises a first torque distribution control section responsive to a first control command for controlling a front-and-rear driving torque distribution between subsidiary drive wheels installed at a first side of front and rear sides of the vehicle and primary drive wheels installed at a second side of the front and rear sides, and a second torque distribution control section responsive to a second control command for controlling a right-and-left drive torque distribution between said primary drive wheels. First and second target slip arithmetic units derive target slip states for the subsidiary drive wheels and for an outer drive wheel of the primary drive wheels, and first and second actual slip arithmetic units derive the actual slip of the subsidiary and outer drive wheels. A decision unit decides whether the vehicle is in an acceleration turning state. An integrated control unit simultaneously controls the first and second torque distribution control systems in the acceleration-turning state to adjust actual slip states toward the target slip states in response to the first and second control commands.

5 Claims, 8 Drawing Sheets

FIG.11

Ti(n-1): PREVIOUS Ti
TAD=(TA+TYG); NEWLY DERIVED TARGET TORQUE

| | | Ti(n-1)<TAD | Ti(n-1)=TAD | Ti(n-1)>TAD |
|---|---|---|---|---|
| OUTER-WHEEL SLIP ≤ ALLOWABLE LIMIT | ΔVS>5Km/h | TAY=(TA+TYG) (UPDATE) | TAY=(TA+TYG) (UPDATE) | TAY=(TA+TYG) (UPDATE) |
| | 3<ΔVS≤5Km/h | AFTER HOLDING CONST. FOR 10msec TAY=min(TA+TYG, Ti(n-1)+0.05) | TAY=(TA+TYG) (UPDATE) | TAY=(TA+TYG) (UPDATE) |
| | 0≤ΔVS≤3Km/h | TAY=Ti(n-1) (HOLD) | TAY=Ti(n-1) (HOLD) | TAY=(TA+TYG) (UPDATE) |
| OUTER-WHEEL SLIP > ALLOWABLE LIMIT | -3≤ΔVS<0Km/h | AFTER HOLDING CONST. FOR 10msec TAY=Ti(n-1)-0.05 | AFTER HOLDING CONST. FOR 10msec TAY=Ti(n-1)-0.05 | AFTER HOLDING CONST. FOR 10msec TAY=min(TA+TYG, Ti(n-1)-0.05) |
| | ΔVS<-3Km/h | TAY=Ti(n-1)-0.5 | TAY=Ti(n-1)-0.5 | TAY=min(TA+TYG, Ti(n-1)-0.5) |

INTEGRATED CONTROL SYSTEM FOR 4WD VEHICLES FOR CONTROLLING DRIVING TORQUE DISTRIBUTION

BACKGROUND OF THE INVENTION

1. Field of the Invention

The present invention relates to an integrated control system for integrally controlling a driving torque distribution between right and left road wheels and a driving torque distribution between front and rear road wheels on four-wheel drive vehicles equipped with both a right-and-left driving-torque distribution control system, for example a differential limiting torque control system, called an active limited slip differential control system, and a front-and-rear driving-torque control system, for example a transfer-clutch engaging force control system, called a torque-split electronic control system.

2. Description of the Prior Art

Recently, there have been proposed and developed various driving-torque distribution integrated control systems for four-wheel drive vehicles in which a right-and-left driving torque distribution and a front-and-rear driving torque distribution can be controlled independently of each other. One such integrated control system has been disclosed in Japanese Patent Provisional Publication (Tokkai Showa) No. 62-292529. The conventional integrated control system operates to control both a first control command indicative of a transfer-clutch engaging force caused by a torque-split electronic control system and a second control command indicative of a differential limiting torque caused by an active limited slip differential control system, so that a control for a front-and-rear driving torque distribution and a control for a right-and-left driving torque distribution are properly linked to each other, so as to enhance a driving performance of the vehicle. However, on the above-noted conventional integrated control system applied to both the torque-split electronic control system and the active limited slip differential control system, suffers from the drawback explained later.

In four-wheel drive vehicles which basically operate at a rear-wheel drive mode, a part of driving torque (engine power) is transferred from the rear wheel side to the front wheel side via the transfer clutch, while a part of driving torque to be applied to one of rear drive wheels is transferred to the other rear wheel via the limited slip differential. In general, the torque-split electronic control system operates to increase the ratio of driving-torque distribution of the front wheel side to the rear wheel side by increasing the engaging force of the transfer clutch, as the wheel-speed difference (the rotational speed difference) between front and rear road wheels is greater. On the other hand, the active limited slip differential control system operates to increase the differential limiting torque by increasing the engaging force of a differential limiting clutch such as a hydraulically-operated multiple-disc type clutch operably employed in the limited slip differential, as an opening angle of an accelerator is greater, or as the wheel-speed difference (the rotational speed difference) between rear-left and rear-right drive wheels is greater. In the conventional system, when accelerating on turns, the torque-split electronic control system and the active limited slip differential control system are controlled independently of each other, as follows.

In the event that the vehicle experiences rear-wheel spin (acceleration slip) owing to accelerating operation (excessive depression of the accelerator pedal) on turns, the front-and-rear wheel-speed difference becomes extremely great. Thus, the torque-split electronic control system controls the front-and-rear driving torque distribution so that the distribution ratio of driving torque to the front-wheels is increased. In such a case, the distribution ratio of driving torque to the front-wheel side would be increased irrespective of occurrence of slippage created at the front wheels. In accordance with the increase in the distribution ratio of driving torque to the front wheels, the front wheels have a tendency to skid, since there is a greatly increased tendency for the cornering force of the front wheels to be reduced owing to transfer of the car weight to the rear wheels, particularly during acceleration-turning. Assuming that the vehicle experiences front-end skid with a great slip ratio owing to excessive distribution of driving torque to the front wheels or the car-weight transfer to the rear wheels, when accelerating on turns, there is a possibility of remarkable reduction of the cornering force at the front wheels. In this case, the vehicle may experience strong understeer or drift-out. On the other hand, the active limited slip differential control system operates to increase the differential limiting torque in response to a great opening angle of the accelerator when accelerating on turns. Assuming that wheel-spin occurs at one of the rear wheels when accelerating on turns, a part of driving torque flows rapidly from the slipping less-traction rear wheel to the non-slipping greater-traction rear wheel, due to the hard differential limiting action resulting from the great opening angle of the accelerator. This results in the decrease in cornering force at the rear wheels. As can be appreciated from the above, when accelerating on turns, there is a possibility of undesirable positive and negative fluctuations in yawing moment, such as repetition of understeer and oversteer, four-wheel drift, or the like. That is, the conventional integrated control system could not provide a satisfactory integrated control for the front-and-rear driving torque distribution and for the right-and-left driving torque distribution, when accelerating on turns. In other words, a cornering stability of the conventional integrated control system is unsatisfactory under a particular running condition wherein the vehicle is accelerated during cornering.

SUMMARY OF THE INVENTION

Accordingly, it is an object of the invention to provide an improved integrated control system for four-wheel drive vehicles for integrally controlling a front-and-rear driving-torque distribution and a right-and-left driving-torque distribution, which system avoids the foregoing disadvantages of the prior art.

It is another object of the invention to provide an improved driving-torque distribution integrated control system for four-wheel drive vehicles, which system can provide a high cornering stability by integrally controlling both a front-and-rear driving-torque distribution and a right-and-left driving-torque distribution in a manner so as to reduce positive and negative fluctuations in yawing moment to the minimum and consequently to maintain a steer characteristic substantially at neutral steer, even when accelerating on turns.

It is a further object of the invention to provide an improved driving-torque distribution integrated control system for four-wheel drive vehicles which basically operate at a rear-wheel drive mode, which system can ensure an adequate cornering force of front wheels by decreasingly compensating a transfer-clutch engaging force based on the wheel-speed difference between front and rear wheels in presence of front-end skid based on accelerating operation and ensure an adequate cornering force of a rear outer-wheel by escaping a part of driving torque from the rear outer-wheel to the rear inner-wheel, in presence of occurrence of acceleration-slip at the rear outer-wheel, during acceleration-turning.

In order to accomplish the aforementioned and other objects of the invention, a driving-torque distribution integrated control system for a four-wheel drive vehicle, for controlling a driving torque distribution between front and rear wheels and a driving torque distribution between right and left wheels, comprises first torque distribution control means responsive to a first control command for controlling a first driving torque distribution between a first group of drive wheels installed at a first side of front and rear sides of the vehicle and a second group of drive wheels installed at a second side of the front and rear sides, second torque distribution control means responsive to a second control command for controlling a second driving torque distribution between right and left drive wheels of the second group, and integrated control means for outputting the first control command to escape a redundant part of driving torque delivered to the first group to the second group by adjustment of the first driving torque distribution when an actual slip state of the first group exceeds a target slip state of the first group during turning, and for outputting the second control command to escape a redundant part of driving torque delivered to an outer wheel of the second group to an inner wheel of the second group by adjustment of the second driving torque distribution as long as the first control command is output.

According to another aspect of the invention, a driving-torque distribution integrated control system for a four-wheel drive vehicle, for controlling a driving torque distribution between front and rear wheels and a driving torque distribution between right and left wheels, comprises first torque distribution control means responsive to a first control command for controlling a first driving torque distribution between a first group of drive wheels installed at a first side of front and rear sides of the vehicle and a second group of drive wheels installed at a second side of the front and rear sides, second torque distribution control means responsive to a second control command for controlling a second driving torque distribution between right and left drive wheels of the second group, target slip arithmetic means for deriving a target slip state of the first group, in which state a cornering force of the first group is maintained at a high level, arithmetic means for deriving an actual slip state of the first group, arithmetic means for deriving a target slip state of an outer wheel of the second group during turning of the vehicle, in which state a cornering force of the outer wheel is maintained at a high level, arithmetic means for deriving an actual slip state of the outer wheel, and integrated control means for outputting the first control command to adjust the actual slip state of the first group toward the target slip state of the first group by controlling the first driving torque distribution when the actual slip state of the first group exceeds the target slip state of the first group during turning, and for outputting the second control command to adjust the actual slip state of the outer wheel toward the target slip state of the outer wheel by controlling the second driving torque distribution as long as the first control command is output.

The integrated control system further comprises vehicle-speed arithmetic means for estimating a vehicle speed every predetermined time intervals, and for setting a current estimate of the vehicle speed during acceleration of the vehicle by adding an integral of a longitudinal acceleration exerted on the vehicle to a previous estimate of the vehicle speed being estimated prior to a current time interval, and the actual slip state of the first group and the actual slip state of the second group both being derived on the basis of the estimate of the vehicle speed. The actual slip state of the first group is defined as an actual slip ratio calculated by dividing a difference between a wheel speed of the first group and the estimate of the vehicle speed by the wheel speed of the first group, and the target slip state of the first group is defined as a target slip ratio, and the first target slip arithmetic means derives the target slip ratio of the first group on the basis of a lateral acceleration exerted on the vehicle, so that the target slip ratio is set at a greater value when the lateral acceleration is maintained within a low lateral acceleration range, and so that the target slip ratio is set at a smaller value when the lateral acceleration is maintained within a high lateral acceleration range. The first target slip arithmetic means also compensates the target slip ratio based on the lateral acceleration on the basis of the estimate of the vehicle speed, so that the target slip ratio is increasingly compensated when the estimate of the vehicle speed is maintained within a low-speed range.

According to a further aspect of the invention, a driving-torque distribution integrated control system for a four-wheel drive vehicle basically operating in a rear-wheel drive mode, for controlling a driving torque distribution between front and rear wheels and a driving torque distribution between right and left wheels, comprises front-and-rear torque distribution control means responsive to a first control command for controlling a front-and-rear driving torque distribution between front drive wheels and rear drive wheels, right-and-left torque distribution control means responsive to a second control command for controlling a right-and-left driving torque distribution between the rear drive wheels, target slip arithmetic means for deriving a target slip state of the front drive wheels, in which state a cornering force of the front drive wheels is maintained at a high level, arithmetic means for deriving an actual slip state of the front drive wheels, arithmetic means for deriving a target slip state of an outer wheel of the rear drive wheels during turning of the vehicle, in which state a cornering force of the outer wheel is maintained at a high level, arithmetic means for deriving an actual slip state of the outer wheel, and integrated control means for outputting the first control command to adjust the actual slip state of the front drive wheels toward the target slip state of the front drive wheels by controlling the front-and-rear driving torque distribution when the actual slip state of the front drive wheels exceeds the target slip state of the front drive wheels during turning, and for outputting the second control command to adjust the actual slip state of the outer wheel toward the target slip state of the outer wheel by controlling the right-and-left driving torque distribution as long as the first control command is output.

According to a still further aspect of the invention, a driving-torque distribution integrated control system for a four-wheel drive vehicle basically operating in a rear-wheel drive mode and equipped with an electronically controlled torque-split transfer and an active limited slip differential, for controlling a driving torque distribution between front and rear wheels and a driving torque distribution between right and left wheels, comprises front-and-rear torque distribution control means connected to the torque-split transfer and responsive to a first control command for controlling a front-and-rear driving torque distribution between front drive wheels and rear drive wheels, right-and-left torque distribution control means connected to the active limited slip differential and responsive to a second control command for controlling a right-and-left driving torque distribution between the rear drive wheels, and integrated control means for outputting the first control command to escape a redundant part of driving torque delivered to the front drive wheels to the rear drive wheels by adjustment of the front-and-rear driving torque distribution when an actual slip state of the front drive wheels exceeds a target slip state of the front drive wheels during turning, and for outputting the second control command to escape a redundant part of driving torque delivered to an outer wheel of the rear drive wheels to an inner wheel of the rear drive wheels by adjustment of the right-and-left driving torque distribution as long as the first control command is output.

BRIEF DESCRIPTION OF THE DRAWINGS

FIG. 11 is a control table for a filtering process according to which an acceleration-responsive controlled differential limiting torque TAY is derived from an acceleration-responsive target torque TAD. +de +cl DESCRIPTION OF THE PREFERRED EMBODIMENTS Referring now to the drawings, particularly to FIG. 1, the integrated control system of the invention is exemplified in case of a front-engine four-wheel drive vehicle which usually operates at a rear-wheel drive mode at which engine power (driving torque) is all delivered to the rear drive wheels. Power produced by an internal combustion engine 1 is transferred from a transmission 2 to a rear propeller shaft 3. The engine power is delivered via an electronically controlled limited slip differential 4, called an active limited slip differential, to rear-left and rear-right drive wheels 5 and 6. The active limited slip differential 4 will be hereinafter abbreviated as an "A-LSD". On the other hand, a part of power is transferred from the rear propeller shaft 3 through an electronically controlled torque-split transfer 7, a front propeller shaft 8 and a front differential 9 to front-left and front-right wheels 10 and 11. The electronically controlled torque-split transfer 7 will be hereinafter abbreviated as an "E-TS transfer".

The A-LSD 4 accommodates therein a differential limiting clutch 13, to produce a differential limiting torque between the rear-left and rear-right wheels, in response to a clutch-control pressure generated from a hydraulic unit 12. The E-TS transfer 7 accommodates therein a transfer clutch 14 to provide a component of driving torque transferred to the front wheels 10 and 11, in response to a clutch-control pressure generated from the hydraulic unit 12. The hydraulic unit 12 includes an oil pressure source 15, an E-TS transfer control valve 16 and an A-LSD control valve 17. The E-TS transfer control valve 16 is responsive to a control command generated from an E-TS control section 18a of a controller 18, to produce the control pressure for the transfer clutch 14 for the purpose of adjustment of the engaging force of the transfer clutch. On the other hand, the A-LSD control valve 17 is responsive to a control command generated from an A-LSD control section 18b of the controller 18, to produce the control pressure for the differential limiting torque clutch 13 for the purpose of adjustment of the engaging force of the clutch 13. In the shown embodiment, a front-and-rear driving-torque distribution control system comprises the E-TS control section 18a and the E-TS transfer control valve 16 by which the engaging force of the transfer clutch 14 is adjusted, while a right-and-left driving-torque distribution control system comprises the A-LSD control section 18b and the A-LSD control valve 17 by which the differential limiting torque is adjusted. As seen in FIG. 1, the controller 18 receives a front-left wheel revolution speed indicative signal NFL generated from a front-left wheel speed sensor 19, a front-right wheel revolution speed indicative signal NFR generated from a front-right wheel speed sensor 20, a rear-left wheel revolution speed indicative signal NRL generated from a rear-left wheel speed sensor 21, a rear-right wheel revolution speed indicative signal NRR generated from a rear-right wheel speed sensor 22, a lateral-acceleration indicative signal YG generated from a lateral acceleration sensor 23 which detects a lateral acceleration exerted on the vehicle body, an accel-opening angle indicative signal Acc generated from an accel-opening angle sensor 24, a switch signal generated from a brake switch 25, and a longitudinal-acceleration indicative signal XG generated from a longitudinal acceleration sensor 26. Information input into the E-TS control section 18a provided in the controller 18 and information input into the A-LSD control section 18b of the controller 18 are interchanged to each other. The controller 18 of the integrated control system of the embodiment operates to derive an estimate VFF(n) of a vehicle speed in accordance with the arithmetic subroutine shown in FIG. 2, as follows. The routine is traditionally executed as time-triggered interrupt routines to be triggered every predetermined intervals.

Figure 1:
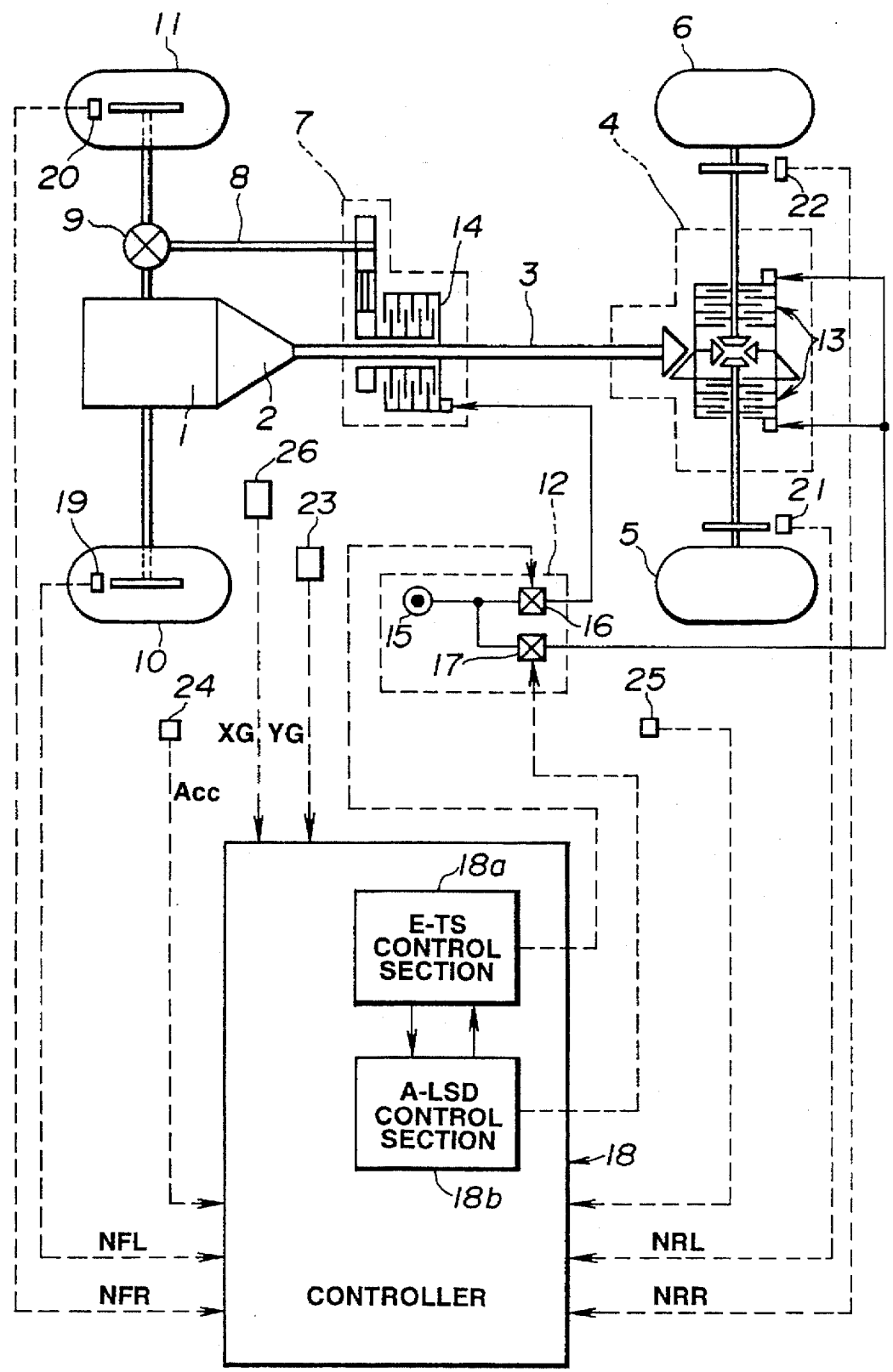
FIG. 1 is a system diagram illustrating one embodiment of a driving-torque distribution integrated control system according to the present invention.

In step 30, when the arithmetic processing is started, data in the controller are first initialized.

In step 31, a front-left wheel speed VFL, a front-right wheel speed VFR, and a longitudinal acceleration XG are read in. Generally, the front-left wheel revolution speed indicative signal value NFL is regarded as being essentially equivalent to the front-left wheel speed VFL, whereas the front-right wheel revolution speed indicative signal value NFR is regarded as being essentially equivalent to the front-right wheel speed VFR.

In step 32, a first vehicle speed VF1 is set by selecting the lower one of the front-left wheel speed VFL and the front-right wheel speed VFR by way of a so-called select-LOW process.

In step 33, a test is made to determine whether the first vehicle speed $V_{F1}$ is greater than a previous vehicle speed $V_{FF}(n-1)$ which is derived prior to the current interrupt routine. When the answer to step 33 is affirmative (YES), i.e., $V_{F1} > V_{FF}(n-1)$, the procedure flows to step 34. The inequality $V_{F1} > V_{FF}(n-1)$ means that the vehicle is conditioned in the accelerating state. In contrast, when the answer to step 33 is negative (NO), i.e., $V_{F1} \leq V_{FF}(n-1)$, the procedure flows to step 35. The inequality $V_{F1} \leq V_{FF}(n-1)$ means that the vehicle is conditioned in the constant-speed driving state or in the decelerating state.

In step 34, the vehicle speed $V_{FF}(n)$ is updated by a value defined by the sum $\{V_{FF}(n-1) + \int X_G\ dt\}$ of the previous vehicle speed $V_{FF}(n-1)$ and the integral of the longitudinal acceleration indicative signal value $X_G$.

In step 35, the vehicle speed $V_{FF}(n)$ is updated by the first vehicle speed $V_{F1}$ set at step 32.

In step 36, the vehicle speed $V_{FF}(n)$ updated currently through steps 34 or 35 is output to both the E-TS control section 18a and the A-LSD control section 18b.

In step 37, the previous value $V_{FF}(n-1)$ of the vehicle speed is updated by the current value $V_{FF}(n)$ of the vehicle speed.

As explained above, in the event that there is less occurrence of slip at the front wheels, i.e., during constant-speed driving or during deceleration, the first vehicle speed $V_{F1}$ corresponding to the smaller one of the front-left and front-right wheel speeds $V_{FL}$ and $V_{FR}$ is utilized as the vehicle speed $V_{FF}(n)$. In the event that there is great slip tendencies at the front wheels, i.e., during acceleration, the variation of the vehicle speed is satisfactorily considered by adding the integral $\int X_G\ dt$ of the detected longitudinal acceleration $X_G$ to the previous vehicle speed $V_{FF}(n-1)$. In the former case, the estimate $V_{FF}(n)$ of the vehicle speed is maintained at a slightly smaller speed level than the true or actual vehicle speed, since the estimated vehicle speed $V_{FF}(n)$ corresponds to the smaller one of the two front wheel speeds $V_{FL}$ and $V_{FR}$. In the latter case, the estimate $V_{FF}(n)$ of the vehicle speed is regarded as the sum $\{V_{FF}(n-1) + \int X_G\ dt\}$ of the previously estimated vehicle speed $V_{FF}(n-1)$ and the integral of the detected longitudinal acceleration $X_G$ without deriving on the basis of the front wheel speeds $V_{FL}$ and $V_{FR}$. On the whole, the accuracy of estimation of the vehicle speed $V_{FF}(n)$ is enhanced. Conventionally, a slip ratio of each road wheel is calculated on the basis of the respective wheel speed and the estimate $V_{FF}(n)$ of the vehicle speed. With the aid of the high accuracy of estimation of the vehicle speed, an accuracy of calculation of the slip ratio of each road wheel can be also enhanced.

The controller 18 also operates to derive a target slip ratio SFI of the front wheel side in accordance with the arithmetic subroutine shown in FIG. 3, as follows. This routine is also executed as time-triggered interrupt routines to be triggered every predetermined intervals.

In step 40, the estimated vehicle speed $V_{FF}(n)$, the detected lateral acceleration $Y_G$ and the detected longitudinal acceleration $X_G$ are all read in.

In step 41, a lateral-acceleration dependent front-wheel target slip ratio SFI($Y_G$) is set on the basis of the lateral acceleration $Y_G$. In the shown embodiment, as appreciated from the data map of step 41 shown in FIG. 3, the target slip ratio SFI($Y_G$) is set at 40% when the detected lateral acceleration $Y_G$ is less than or equal to 0.3 G, and at 5% when the lateral acceleration $Y_G$ is greater than or equal to 0.8 G. In case that the lateral acceleration $Y_G$ is greater than 0.3 G and less than 0.8 G, the target slip ratio SFI($Y_G$) is decreased from 40% down to 5% in proportion to the increase in the lateral acceleration $Y_G$.

In step 42, a correction coefficient SFI(V) of the front-wheel side slip ratio is set on the basis of the estimated vehicle speed $V_{FF}(n)$. As appreciated from the data map of step 42 shown in FIG. 3, the correction coefficient SFI(V) is set at "2" when the estimated vehicle speed $V_{FF}(n)$ is less than or equal to 40 km/h, and at "1" when the estimated vehicle speed $V_{FF}(n)$ is greater than or equal to 50 km/h. In case that the estimated vehicle speed $V_{FF}(n)$ is greater than 40 km/h and less than 50 km/h, the correction coefficient SFI(V) is decreased from "2" down to "1" in proportion to the increase in the estimated vehicle speed $V_{FF}(n)$.

In step 43, a front-wheel target slip ratio SFI is calculated as a final front-wheel target slip ratio on the basis of both the slip-ratio correction coefficient SFI(V) and the lateral-acceleration dependent front-wheel target slip ratio SFI($Y_G$). Actually, the final front-wheel target slip ratio SFI is obtained by multiplying the lateral-acceleration dependent front-wheel target slip ratio SFI($Y_G$) by the correction coefficient SFI(V).

In step 44, the front-wheel target slip ratio SFI calculated at step 43 is output to the E-TS control section 18a for the transfer 7.

Figure 3:
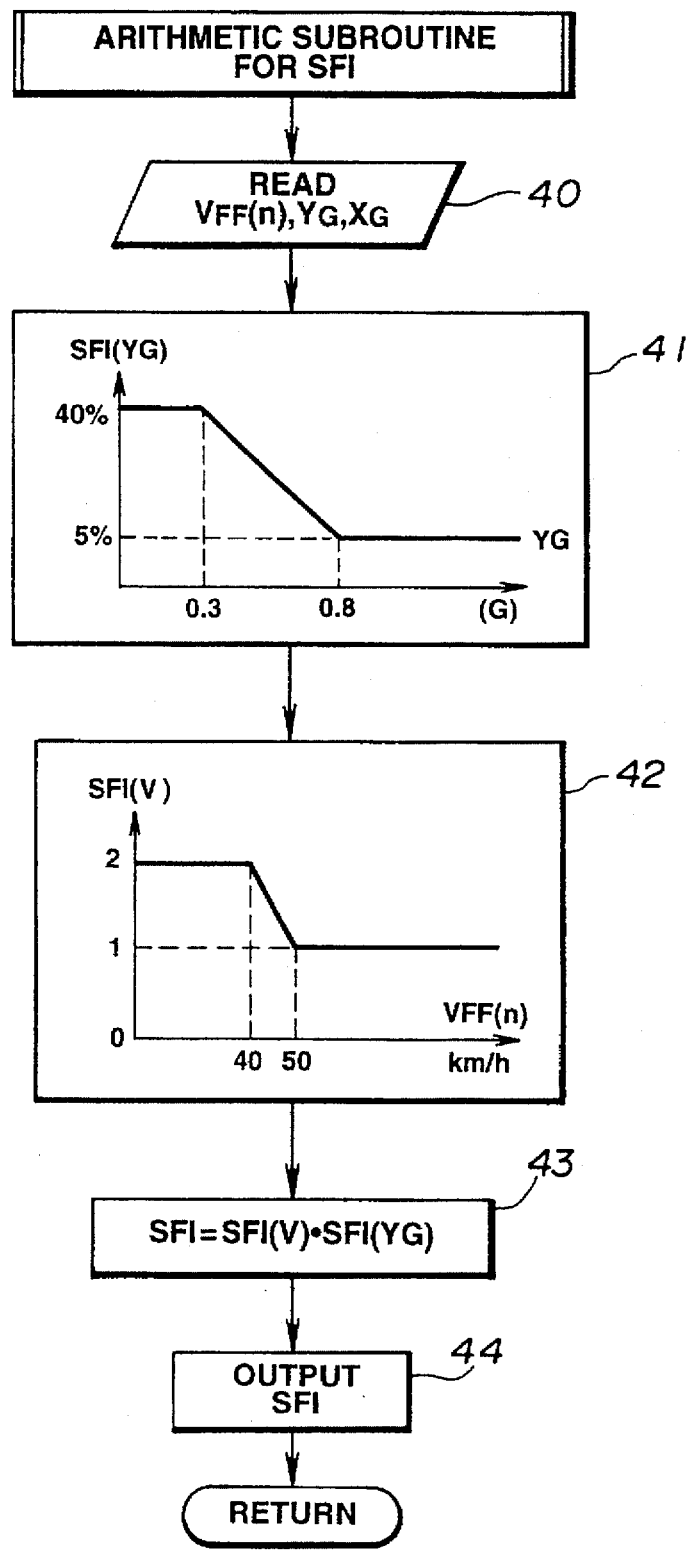
FIG. 3 is a flow chart illustrating a control flow of an arithmetic subroutine for a target slip ratio assigned to the front wheel side, executed by the controller of the integrated control system shown in FIG. 1.

As appreciated from the data map of step 41 shown in FIG. 3, since the lateral-acceleration dependent front-wheel target slip ratio SFI($Y_G$) is set at a comparatively high slip ratio for example 40% within a low lateral-acceleration range, the E-TS control section 18a cannot easily come into operation. In such a low lateral-acceleration range, the cornering behaviour of the vehicle can be certainly controlled by way of correction of steering, without providing undesirable control operation of the E-TS control section 18a. On the other hand, the lateral-acceleration dependent front-wheel target slip ratio SFI($Y_G$) is set at a comparatively low slip ratio for example 5% within a high lateral-acceleration range, and thus the E-TS control section 18a can easily come into operation for the purpose of increasing the distribution ratio of driving torque delivered to the front wheel side. In such a high lateral-acceleration range in which good steering effect or good steering control must be assured, the cornering behaviour of the vehicle can be optimally controlled by way of the front-and-rear driving-torque distribution control executed by the E-TS control section 18a. Thus, the cornering stability can be assured.

As appreciated from the data map of step 42 shown in FIG. 3, since the front-wheel slip ratio correction coefficient SFI(V) is set at a relatively high coefficient for example "2" within a low vehicle-speed range, i.e., when the vehicle is started or when the vehicle is running at a low speed, the E-TS control section 18a cannot easily come into operation. In such a low vehicle-speed range, the cornering behaviour of the vehicle can be certainly controlled by way of correction of steering, without providing undesirable control operation of the E-TS control section 18a. In contrast to the above, in case that the slip ratio correction coefficient SFI(V) is set at a relatively low coefficient for example "1" within a high vehicle-speed range, i.e., when the vehicle is running at a high speed, the E-TS control section 18a can easily come into operation. As can be appreciated from the above, the front-wheel target slip ratio SFI is designed in a manner so as to execute the front-and-rear driving-torque distribution control when accelerating on turns with a high lateral acceleration and at a high speed.

The control procedure for the front-and-rear driving-torque distribution executed by the E-TS control section 18a of the controller 18 is hereinafter described in detail in accordance with the flow chart of FIG. 4.

Figure 2:
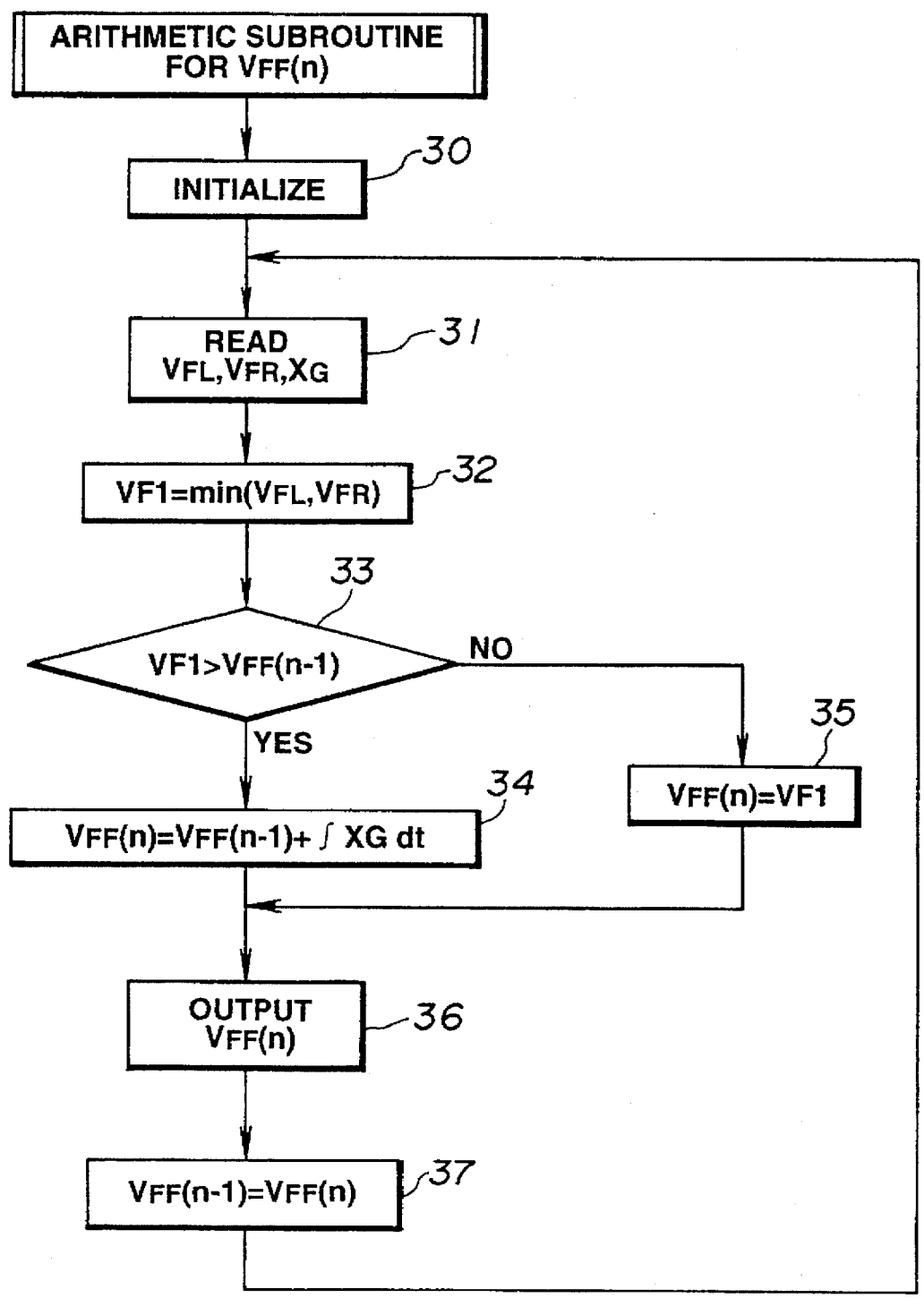
FIG. 2 is a flow chart illustrating a control flow of an arithmetic subroutine for a vehicle-speed calculation executed by a controller incorporated in the integrated control system shown in FIG. 1.

In step 50, the front-left wheel speed VFL, the front-right wheel speed VFR, the rear-left wheel speed VRL, the rear-right wheel speed VRR, the lateral acceleration YG, the vehicle speed VFF(n) estimated through the arithmetic processing of FIG. 2, and the front-wheel side target slip ratio SFI calculated through the arithmetic processing of FIG. 3 are all read in.

In step 51, a front wheel speed VWF is calculated as the mean of the front-left wheel speed VFL and the front-right wheel speed VFR.

In step 52, a front-wheel slip ratio SF which is regarded as an actual slip ratio at the front wheels, is calculated in accordance with the following expression.

$$SF = (V_{WF} - V_{FF}(n))/V_{WF}$$

In step 53, the deviation SFF between the front-wheel target slip ratio SFI and the front-wheel slip ratio SF is calculated as follows.

$$SFF = SFI - SF$$

In step 54, a test is made to determine whether the deviation SFF is greater than or equal to zero. The answer to step 54 is affirmative (YES), i.e., in case of SFF≧0, step 55 enters wherein a control flag FFS is set at "0". Conversely, the answer to step 54 is negative (NO), i.e., in case of SFF<0, step 58 enters wherein the control flag FFS is set at "1". The inequality SFF≧0 means that there is less slip at the front wheels in comparison with an allowable slip ratio. On the other hand, the inequality SFF<0 means that there is greater slip at the front wheels.

In steps 56 and 59, a first controllable driving torque TE for the front wheels which torque essentially corresponds to the engaging force of the transfer clutch 14, is derived on the basis of a lateral-acceleration dependent controllable gain Kh and a rotational speed difference ΔV between the front and rear wheels, in accordance with the expression TE=Kh·ΔV. Usually, the controllable gain Kh is derived on the basis of a predetermined formula Kh=α/YG, where Kh≦β, and α and β are constant. The controllable gain Kh is determined in accordance with a preset controllable gain characteristic curve stored in the controller. Optimal constant values α and β are experimentally selected so that the vehicle is always maintained in a substantially neutral steer even when the vehicle is travelling on various roads, such as wet or icy roads and dry pavements. The rotational speed difference ΔV between the front and rear wheels is usually derived as the difference between the mean (VRL+VRR)/2 of the rear-left wheel speed VRL and the rear-right wheel speed VRR and the mean (VFL+VFR)/2 of the front-left wheel speed VFL and the front-right wheel speed VFR. The arithmetic processing for the controllable gain Kh and the rotational speed difference ΔV is conventional and forms no part of the present invention. Typical details of the arithmetic processing for the gain Kh and the rotational speed difference ΔV has been set forth, for example, in U.S. Pat. No. 5,251,719, entitled "ACTIVE TORQUE-SPLIT CONTROL SYSTEM FOR ACTIVELY DISTRIBUTING DRIVING TORQUES APPLIED TO WHEELS IN FOUR-WHEEL DRIVE VEHICLES", issued on Oct. 12, 1993 to Yoshiyuki Eto et al., assigned to the common assignee to the present invention, the teachings of which are hereby incorporated by reference for the sake of disclosure.

In step 57, a control command is generated from the E-TS control section 18a to produce the first controllable driving torque TE by adjusting the engaging force of the transfer clutch 14. In this manner, in absence of slip at the front wheel side, the driving torque delivered to the front wheels is adjusted towards the first controllable driving torque TE based on a usual front-and-rear driving-torque distribution control of the E-TS control section 18a.

In step 60, a second controllable driving torque Tm for the front wheels is derived on basis of the first controllable driving torque TE derived through step 59 and the slip-ratio deviation SFF calculated at step 53, in accordance with the following expression.

$$Tm = TE - Kp \cdot SFF$$

where Kp is a proportional gain and Kp>0.

In step 61, a control command is generated from the E-TS control section 18a to produce the second controllable driving torque Tm.

As appreciated from the above, the second controllable driving torque Tm is set at a lower level than the first controllable driving torque TE, such that the first controllable driving torque TE is decreasingly compensated under a particular condition of the control flag FFS=1, i.e., in presence of slip at the front-wheel side. The decreasingly compensated second controllable driving torque Tm is suitable for an acceleration-turning state of the vehicle, as set out below.

With the above-noted arrangement, during acceleration-turning wherein the vehicle is accelerated during turns, the vehicle experiences acceleration slip at the rear wheels 5 and 6. Under this condition, the E-TS control section 18a performs the usual front-and-rear torque distribution control, that is, the usual E-TS transfer control, based on the first controllable driving torque TE. Since the first controllable driving torque TE reflects proportionally a great rotational speed difference ΔV as seen in step 56 of FIG. 4, during acceleration-turning, the magnitude of the first torque TE is adjusted to a great value. Owing to excessive torque distribution to the front wheels, there is a greatly increased tendency for the front-wheel slip (the front wheel-spin) to occur. Supposing that the usual E-TS transfer control is further continued, the cornering force at the front wheels will be reduced. As a result of reduction of the cornering force at the front wheel side, drift-out tendencies are increased. In this manner, when the front wheel slip ratio SF exceeds the front-wheel target slip ratio SFI, that is, in case of SFF<0, the control procedure flows from step 54 through steps 58, 59 and 60 to step 61. Thus, the distribution of driving force to the front wheel side is decreasingly compensated by utilizing the second controllable driving torque Tm, in a manner so as to adjust the front-wheel slip ratio SF towards the front-wheel target slip ratio SFI. As a result, the cornering force at the front wheels 10 and 11 can be satisfactorily assured. Actually, since the control flag FFS is set at "1" for producing the second controllable driving torque Tm suitable for the acceleration-turning state, this flag FFS will be hereinafter referred to as an "acceleration-turning control flag". The control for the E-TS transfer based on the second controllable driving torque Tm will be hereinafter referred to as an "acceleration-turning E-TS control".

On the other hand, the control procedure for the differential limiting torque control executed by the A-LSD control section 18b of the controller 18 is hereinbelow described in detail in accordance with the flow chart of FIG. 5.

In step 70, the front-left revolution speed NFL, the front-right revolution speed NFR, the rear-left revolution speed NRL, the rear-right revolution speed NRR, the lateral acceleration YG, accel-opening angle Acc, the longitudinal acceleration $X_G$, the acceleration-turning control flag FFS, and the estimated vehicle speed $V_{FF}(n)$ are all read in.

In step 71, the wheel revolution speeds $N_{FL}$, $N_{FR}$, $N_{RL}$ and $N_{RR}$ are replaced respectively as front-left, front-right, rear-left and rear-right wheel speeds $V_{FL}$, $V_{FR}$, $V_{RL}$ and $V_{RR}$.

In step 72, a test is made to determine on the basis of the sign (the direction) of the detected lateral acceleration $Y_G$ whether the vehicle turns to the right or the left. For example, in case of the right turn, step 73 proceeds in which the rear-left wheel speed $V_{RL}$ is determined as an outer wheel speed $V_{OUT}$. In contrast, in case of the left turn, step 74 proceeds in which the rear-right wheel speed $V_{RR}$ is determined as an outer wheel speed $V_{OUT}$.

Figure 6:
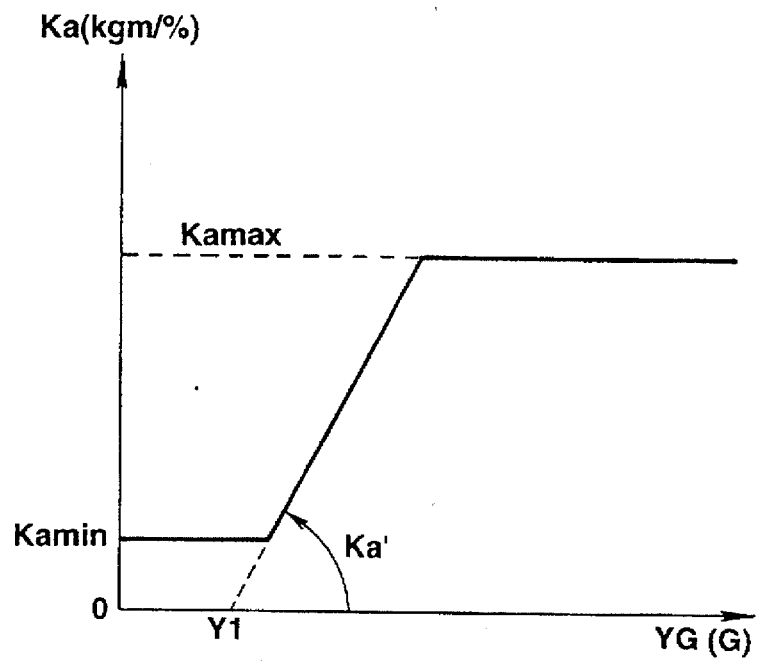
FIG. 6 is a graph illustrating a control gain Ka versus lateral acceleration YG characteristic.
Figure 7:
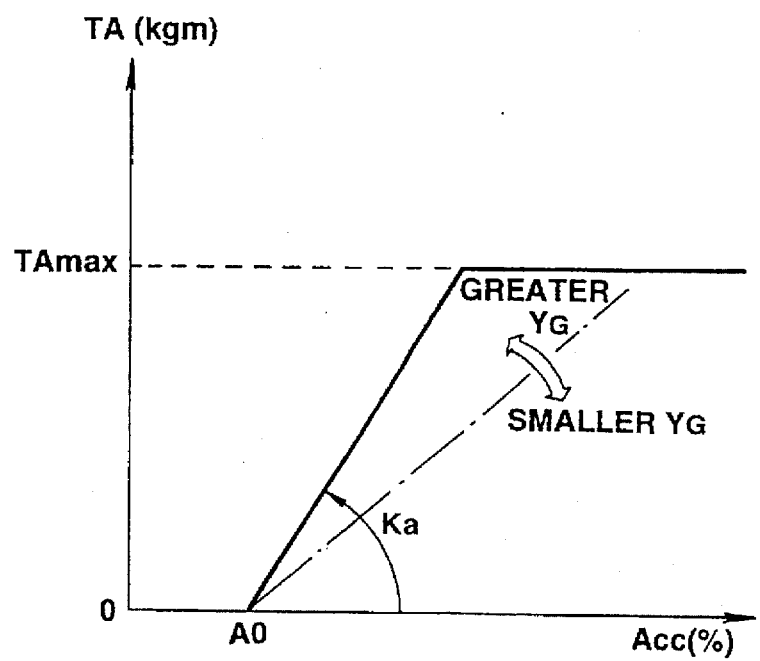
FIG. 7 is a graph illustrating an accel-opening responsive torque characteristic TA.

In step 75, the controller 18 derives and calculates an accel-opening responsive torque $T_A$ on the basis of the accel-opening angle Acc, the lateral acceleration $Y_G$, and the estimated vehicle speed $V_{FF}(n)$. The accel-opening responsive torque $T_A$ is determined on the basis of the accel-opening angle Acc, a specified offset value A0 of the accel-opening angle, a specified maximum value $T_{Amax}$ of the accel-opening responsive torque $T_A$, and a control gain $K_a$, in accordance with the characteristic shown in FIGS. 6 and 7. As seen in FIG. 6, the control gain $K_a$ for the accel-opening responsive torque $T_A$ is determined on the basis of a specified offset value Y1 of the lateral acceleration $Y_G$, upper and lower limits $K_{amax}$ and $K_{amin}$ of the control gain $K_a$, and the vehicle-speed dependent control gain $K_a'$ for the control gain $K_a$. The vehicle-speed dependent control gain $K_a'$ and the vehicle-speed dependent upper limit $K_{amax}$ of the control gain $K_a$ are derived through a specified vehicle-speed versus control gain $K_a'$ characteristic (not shown) according to which the higher the vehicle speed, the lower the limit $K_{amax}$, in a conventional manner. That is to say, the two factors $K_a'$ and $K_{amax}$ are not tuning constants, but vehicle-speed dependent variables. Such a vehicle-speed dependent gain/upper limit control has been disclosed in U.S. Pat. No. 5,168,953 to Genpei Naito, assigned to the same assignee to the present invention, the teachings of which are hereby incorporated by reference. The two offset values Y1 and A0, the lower limit $K_{amin}$ of the control gain $K_a$, and the maximum value $T_{Amax}$ of the accel-opening responsive torque $T_A$ are tuning constants which are optimally selected depending on various types of automotive vehicles and on a specified control objective.

Figure 8:
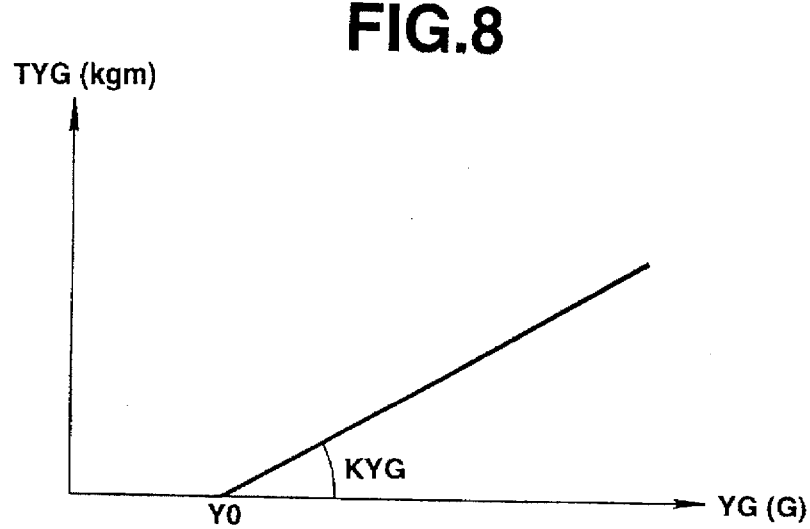
FIG. 8 is a graph illustrating a lateral-acceleration responsive torque characteristic TYG.

In step 76, a lateral-acceleration responsive torque $T_{YG}$ is derived and calculated on the basis of the lateral acceleration $Y_G$ in accordance with the characteristic shown in FIG. 8. The characteristic of FIG. 8 is defined by a specified offset value Y0 of the lateral acceleration and a proportional gain $K_{YG}$ for the lateral acceleration responsive torque $T_{YG}$. These factors Y0 and $K_{YG}$ are also tuning constants. As seen in FIG. 8, the lateral-acceleration responsive torque $T_{YG}$ increases in direct proportion to the lateral acceleration $Y_G$ in case of the lateral acceleration above the offset value Y0.

In step 77, an acceleration-responsive target torque $T_{AD}$ is temporarily calculated as the sum $(T_A+T_{YG})$ of the accel-opening responsive torque $T_A$ and the lateral-acceleration responsive torque $T_{YG}$.

In step 78, an outer-wheel target slip speed $V_S$ is derived as the product $(V_{SA} \times K_{SG})$ of a vehicle-speed dependent reference target slip speed $V_{SA}$ and a lateral-acceleration dependent proportional gain $K_{SG}$. The vehicle-speed dependent reference target slip speed $V_{SA}$ and the lateral-acceleration dependent proportional gain $K_{SG}$ are respectively derived from the characteristics shown in FIGS. 9 and 10. As appreciated, the derived outer-wheel target slip speed $V_S$ is generally correlative to a permissible slippage or an allowable slip amount of the outer wheel during turns.

In step 79, an actual outer-wheel slip speed $V_{RS}$ is determined as the difference $(V_{OUT}-V_{FF}(n))$ between the outer-wheel speed $V_{OUT}$ derived at step 73 and the estimated vehicle speed $V_{FF}(n)$.

In step 80, a slip speed difference $\Delta V_S$ is determined as the difference $(V_S-V_{RS})$ between the outer-wheel target slip speed $V_S$ and the actual outer-wheel slip speed $V_{RS}$.

In step 81, a test is made to determine whether the acceleration-turning control flag FFS is set at "1". The answer to step 81 is affirmative, step 82 proceeds in which an acceleration-responsive controlled differential limiting torque $T_{AY}$ is derived by filtering the derived acceleration-responsive target torque $T_{AD}$ through a predetermined filtering process based on the control table shown in FIG. 11. The filtering process is detailed later. The answer to step 81 is negative, step 83 proceeds in which the acceleration-responsive controlled torque $T_{AY}$ is updated by the acceleration-responsive target torque $T_{AD}$.

In step 84, the A-LSD control section 18b selects the higher one of the acceleration-responsive controlled torque $T_{AY}$ and a preset initial torque $T_{Imin}$ through a select-HIGH process, and sets the selected higher one as an initial controlled torque $T_I$.

In step 85, the A-LSD control section 18b output a control command to the A-LSD control valve 17 in response to the initial controlled torque value to produce the control pressure for the differential limiting torque clutch 13, thereby providing the initial controlled torque $T_I$ as the differential limiting torque.

In comparison with a so-called usual A-LSD control flowing from step 81 through step 83 to steps 84 and 85, the differential limiting torque control flowing from step 81 through step 82 to steps 84 an 85 will be hereinafter referred to as an "acceleration-turning A-LSD control".

The aim in providing the above-noted outer-wheel target slip speed $V_S$ for determination of the controlled differential limiting torque is explained below.

Figure 9:
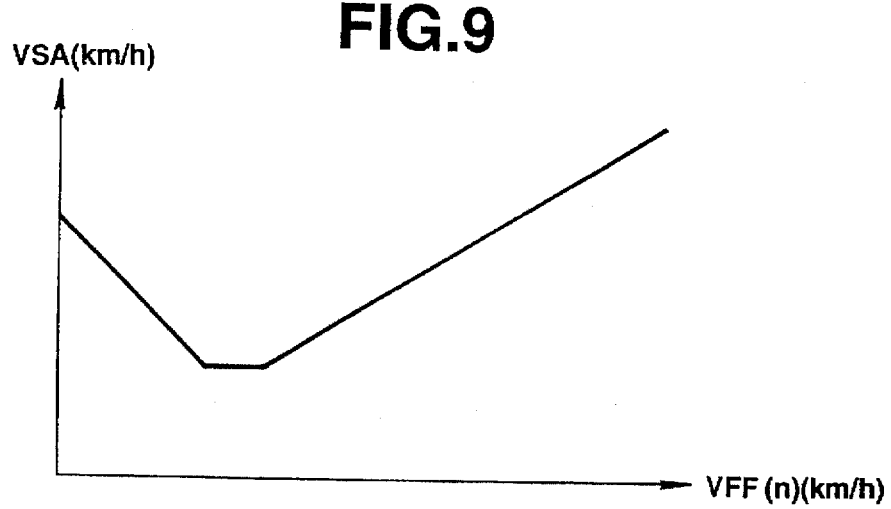
FIG. 9 is a graph illustrating a vehicle speed VFF versus reference target slip speed VSA.
Figure 10:
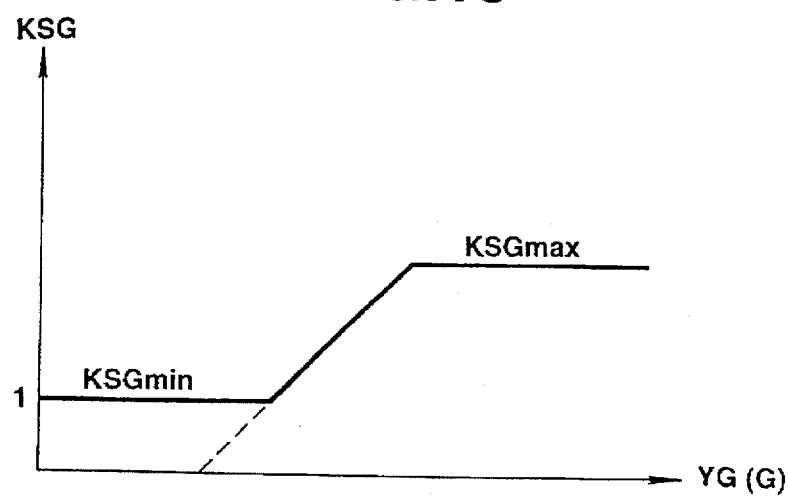
FIG. 10 is a graph illustrating a lateral acceleration YG versus proportional gain KSG of the target slip speed Vs of the outer drive wheel.

The cornering stability of the vehicle is ensured when the vehicle is operated in a cornering warning region that is close to a critical state which the vehicle will experience oversteer, because the outer-wheel target slip speed $V_S$ serving as a criterion of the outer-wheel speed $V_{OUT}$ is determined depending on the estimated vehicle speed $V_{FF}(n)$ and additionally the acceleration-responsive controlled differential limiting torque $T_{AY}$ is derived through the proper filtering process as detailed later with respect to the acceleration-responsive target torque $T_{AD}$ in response to the slip speed difference $\Delta V_S$. The acceleration performance is enhanced in a low speed region, because the outer-wheel target slip speed $V_S$, namely an allowable slip limit at the outer wheel, is set at a higher level in the low speed region, as appreciated from the left-hand side descending line shown in FIG. 9. In the low speed region, the acceleration-responsive target torque $T_{AD}$ tends to be insensitive to the filtering process owing to the high-level target slip speed $V_S$, i.e., the relatively high allowable slip limit, and thus the slip speed difference $\Delta V_S$ can be maintained at a relatively great value, for example 5 Km or more. During cornering with a high lateral acceleration on dry pavements, adequate traction is provided, since the proportional gain $K_{SG}$ increases in accordance with an increase in the lateral acceleration $Y_G$, as seen in FIG. 10, and thus the outer-wheel target slip speed $V_S$ regarding as the allowable slip limit is set at a relatively high level. Therefore, during cornering on dry pavements, the slip speed difference $\Delta V_S$, namely the outer-wheel slippage caused by accelerating operation can be maintained within the allowable slip limit. The target slip speed $V_S$ is very important because the filtering process executed in step 82 of FIG. 5 is achieved on the basis of the comparison results of the actual slip speed VRS therewith. The filtering process is hereinbelow detailed in accordance with the control table shown in FIG. 11.

Referring now to FIG. 11, the filtering process is performed by a filter incorporated in the A-LSD control section 18$b$ of the controller 18. The filtering process to the acceleration-responsive target torque TAD, i.e., (TA+TYG) is different depending on various states defined by the relation between the slip speed difference $\Delta$Vs and comparison results between the acceleration-responsive target torque TAD and the previous initial controlled torque Ti(n−1) derived through the time-triggered interrupt routine shown in FIG. 5 one cycle before, for example 10 msec before. As appreciated from the control table shown in FIG. 11, in case that the outer-wheel slippage (acceleration-slip amount) occurring due to accelerating operation, is less than or equal to the allowable slip limit, that is, when the actual outer-wheel slip speed VRS is less than or equal to the outer-wheel target slip speed Vs, the zone below the allowable slip limit is divided into three different states with respect to the slip speed difference $\Delta$Vs, namely a first slip speed difference area defined by an inequality $\Delta$Vs>5 Km/h, a second slip speed difference area defined by an inequality 3 Km/h<$\Delta$Vs$\leq$5 Km/h, and a third slip speed difference area defined by an inequality 0$\leq\Delta$Vs$\leq$3 Km/h. On the other hand, in case that the outer-wheel slippage exceeds the allowable slip limit, that is, in case of VRS>Vs, the zone above the allowable slip limit is divided into two different states with respect to the slip speed difference, namely a fourth slip speed difference area defined by an inequality −3 Km/h$\leq\Delta$VS<0, and a fifth slip speed difference area defined by an inequality $\Delta$Vs<−3 Km/h. The respective five states of the slip speed difference are further divided into three different areas based on the comparison results between the instantaneously derived acceleration-responsive target torque TAD and the previous initial controlled torque Ti(n−1). The three different areas are a first area defined by an inequality Ti(n−1)<TAD, a second area defined by an inequality Ti(n−1)=TAD, and a third area defined by an inequality Ti(n−1)>TAD. As a whole, the fifteen areas are defined in the control table. The first slip speed difference area defined by $\Delta$VS>5 Km/h means that the outer-wheel slippage is sufficiently small as compared with the allowable slip limit correlated to the outer-wheel target slip speed Vs. The second slip speed difference area defined by 3 Km/h<$\Delta$Vs$\leq$5 Km/h means that the outer-wheel slippage is slightly small as compared with the allowable slip limit. The third slip speed difference area defined by 0$\leq\Delta$Vs<3 Km/h means that the outer-wheel slippage is equivalent to the allowable slip limit. The fourth slip speed difference area defined by −3 Km/h$\leq\Delta$VS<0 means that the outer-wheel slippage slightly exceeds the allowable slip limit. The fifth slip speed difference area defined by $\Delta$VS<−3 Km/h means that the outer-wheel slippage greatly exceeds the allowable slip limit. The first area defined by Ti(n−1)<TAD means that a torque-increase operation for the controlled differential limiting torque is required depending on various conditions, such as an increase in the lateral acceleration and/or an increase in the accel-opening angle. The second area defined by Ti(n−1)=TAD means that a torque-hold operation for the controlled differential limiting torque. The third area defined by Ti(n−1)>TAD means that a torque-reduction operation for the differential limiting torque is required depending on various conditions, such as a decrease in the lateral acceleration and/or a decrease in the accel-opening angle.

With the above-noted arrangement of the filter of the A-LSD control section 18$b$, the system operates as follows.

When the vehicle is not conditioned in a critical cornering region during turns in presence of accel-depression, that is, in case of $\Delta$Vs>5 Km/h, the acceleration-responsive controlled differential limiting torque TAY is quickly updated by the acceleration-responsive target torque TAD (=TA+TYG) without any torque limitation and any time delay, and thus the differential limiting torque control is executed based on the quickly updated controlled torque TAY essentially equivalent to the target torque TAD. In this manner, the differential limiting torque control is quickly executed with a high response to the accelerating operation in consideration of both factors, namely the accel-opening responsive torque TA and the lateral-acceleration responsive torque TYG, and thus a high acceleration performance is obtained depending on the accel-opening angle Acc during acceleration-turning.

When the vehicle is operating in a cornering critical region on turns in presence of accel-depression, that is, in case of $\Delta$Vs$\leq$5 Km/h, the acceleration-responsive target torque TAD is properly filtered through the previously-noted filtering process and additionally the acceleration-responsive controlled torque TAY is updated by the filtered torque, so that the outer-wheel slippage (acceleration-slip amount) occurring due to acceleration is maintained within the allowable slip limit. That is, the outer-wheel slip speed is maintained within the derived outer-wheel target slip speed Vs. As can be appreciated from the above, during acceleration-turning, the cornering force created at the outer wheel cannot be rapidly dropped but retained at a high level, thereby preventing rapid change in the vehicle behaviour owing to the accelerating operation, called power oversteer. As set out above, in the A-LSD control section 18$b$, the acceleration-responsive controlled torque TAY is set by way of the previously-explained proper filtering process according to which the acceleration-responsive target torque TAD is filtered to suitably suppress an increment and decrement of the updated acceleration-responsive controlled torque depending on the slip speed difference $\Delta$Vs and the magnitude relation between the acceleration-responsive target torque TAD and the previous initial controlled torque Ti(n−1). With the filtered differential limiting torque, the actual slip speed VRS at the outer wheel is constantly adjusted to be below the derived target slip speed Vs in order to maintain the cornering force created at the outer wheel is maintained at a high level during acceleration-turning. Thus, a rapid change in the vehicle behaviour is effectively prevented in the cornering critical region, while ensuring the highest possible acceleration performance depending on the accelerating operation during turns. As seen in FIG. 9, in the low-speed region, since the target slip speed Vs (regarded as the allowable slip limit) is set at a higher level as compared with the medium-speed region, the acceleration-responsive target torque TAD is not easily limited through the filtering process, and whereby the acceleration performance of the vehicle is enhanced in the low-speed region. As seen in FIG. 10, the lateral-acceleration YG versus the proportional gain KSG characteristic is so designed that the allowable slip limit is set to a higher level due to the proportional gain KSG set at a comparatively large value when detecting a great lateral acceleration exerted on the vehicle body. Thus, good traction can be ensured during turns with a high lateral acceleration on dry pavements. Details of the aim in providing the accel-opening responsive torque TA, the lateral-acceleration responsive torque TYG, and the outer-wheel target slip speed Vs has been clearly described, for example, in U.S. patent application Ser. No. 08/268,527 (corresponding to Japanese Patent Application No. 5-194462), filed Jul. 6, 1994, and assigned to the assignee to the present invention, and the specification of that application is specifically incorporated by reference.

Figure 4:
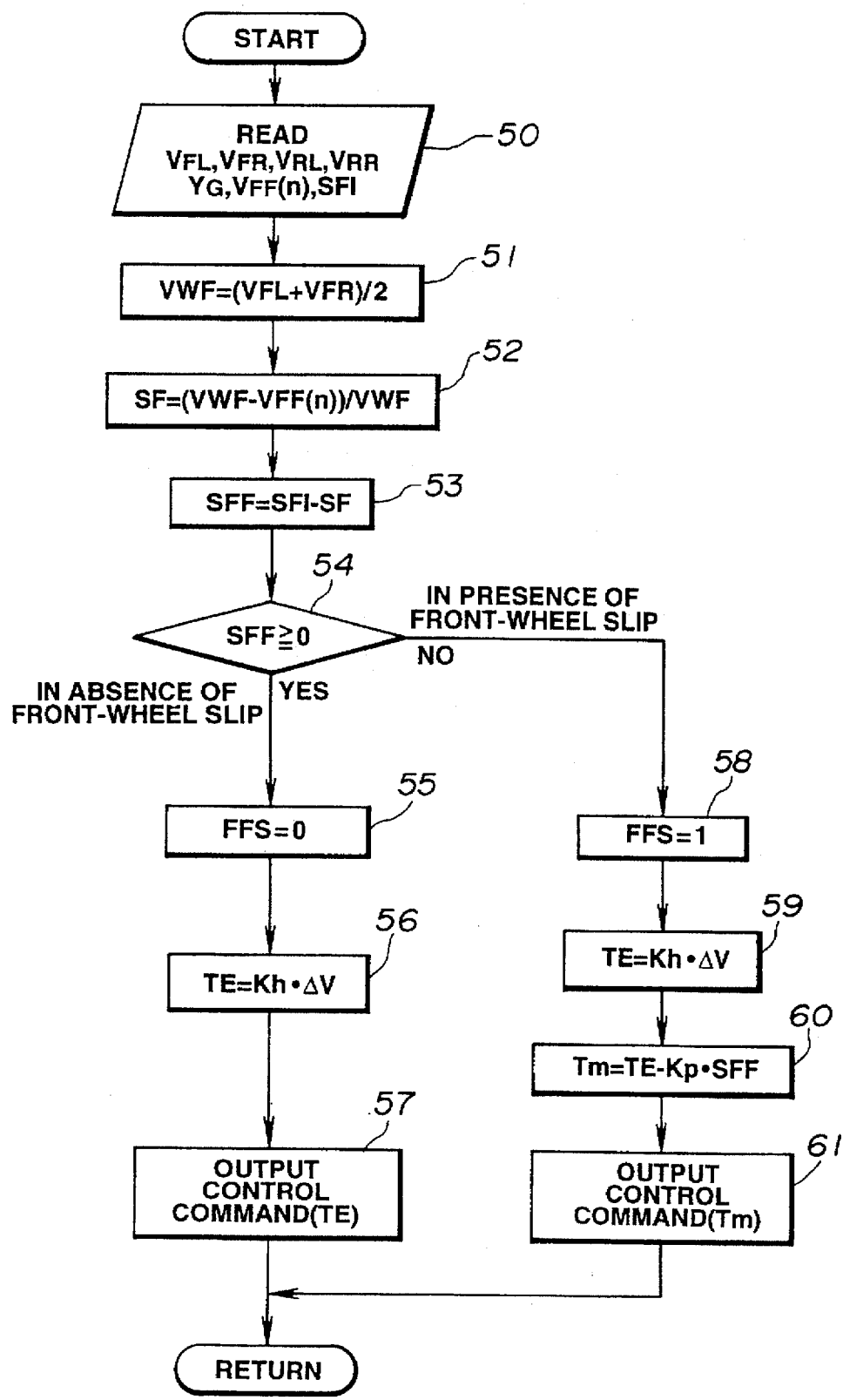
FIG. 4 is a flow chart illustrating the operation of the front-and-rear driving-torque distribution control, executed by a torque-split electronic control section of the controller shown in FIG. 1.
Figure 5:
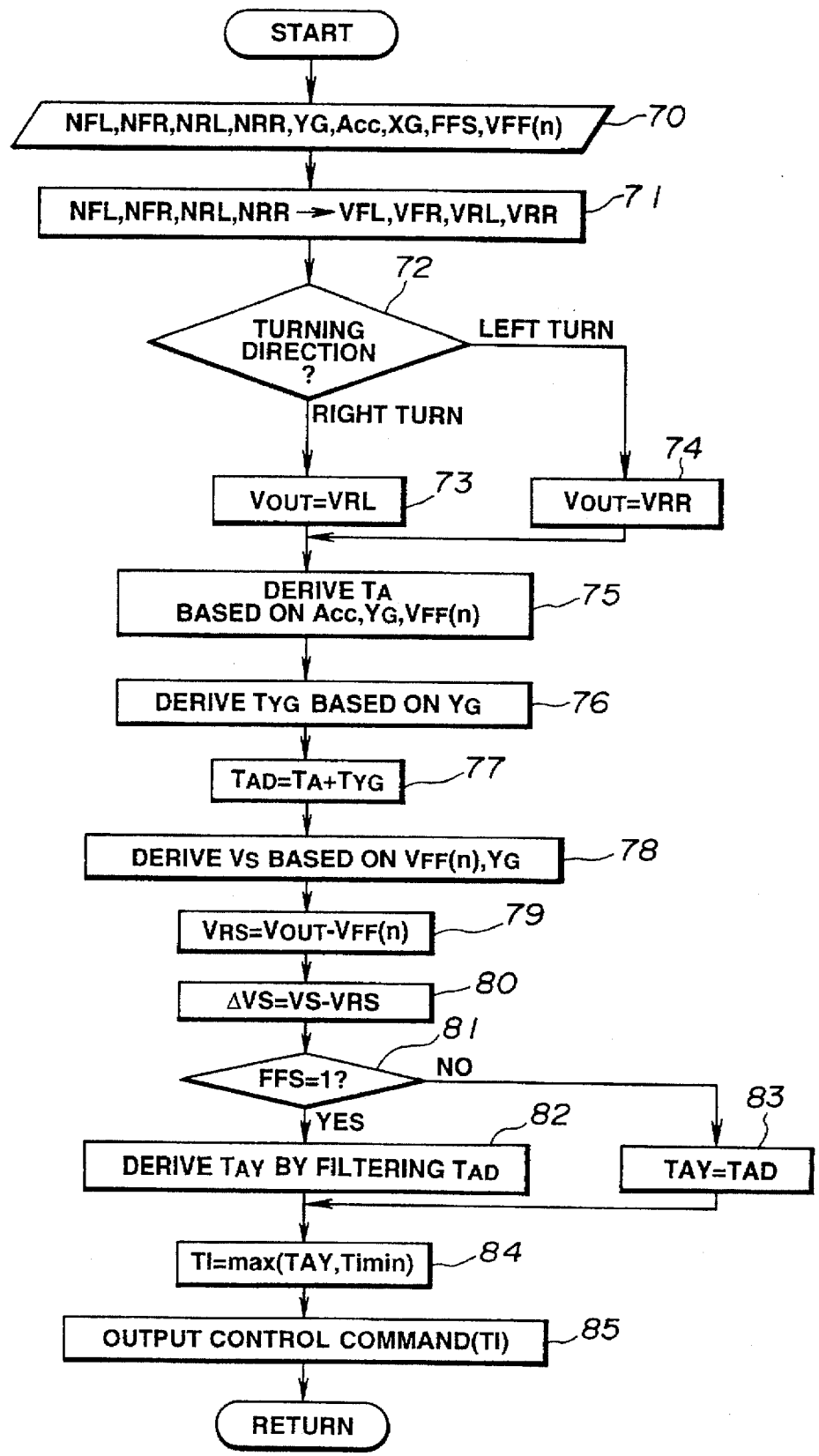
FIG. 5 is a flow chart illustrating the operation of the right-and-left driving-torque distribution control, executed by an active limited slip differential control section of the controller shown in FIG. 1.

As appreciated from step 58 of FIG. 4 and step 81 of FIG. 5, in the event that the acceleration-turning E-TS control is executed by the E-TS control section 18a in response to occurrence of slip at the front wheels and thus the acceleration-turning control flag FFS is set at "1", the differential limiting torque is controlled by means of the A-LSD control section 18b in accordance with the flow from step 81 to step 85 via steps 82 and 84. That is, in case of the control flag FFS=1, the acceleration-responsive target torque TAD is properly filtered by way of the above-noted filtering process through which the differential limiting torque for the A-LSD 4 is suitably controlled by proper adjustment of the acceleration-responsive differential limiting controlled torque TAY, with the result that the outer-wheel slippage is constantly maintained within the allowable slip limit. As can be appreciated, by setting the acceleration-turning control flag FFS, the two control sections 18a and 18b are integrateally controlled with each other, and whereby the system made according to the present invention can perform an integrated control for both the engaging force of the transfer clutch 14 of the E-TS transfer 7 and the differential limiting torque of the differential limiting torque clutch 13 of the A-LSD 4. Concretely speaking, during acceleration-turning, on the one hand, a redundant part of driving torque to be delivered to the front wheels flows toward the rear wheels 5 and 6 by way of the above-noted acceleration-turning E-TS control, but, on the other hand, the differential limiting torque is properly adjusted by way of the previously-explained acceleration-turning A-LSD control including the filtering process to the acceleration-responsive target torque TAD, as long as the acceleration-turning control flag FFS is set at "1". That is, in accordance with the acceleration-turning A-LSD control, the outer-wheel target slip speed VS is set so that the cornering force created at the outer wheel of a comparatively great wheel load is satisfactorily ensured. When the actual outer-wheel slip speed VRS exceeds the outer-wheel target slip speed VS, engine power (driving torque) is transferred or escaped from the outer wheel to the inner wheel, by reducing the differential limiting torque, and thus the cornering force of the outer wheel is ensured. As a consequence, in case of the exemplified integrated control system applied to four-wheel drive vehicles which basically operate at a rear-wheel drive mode, during acceleration-turning, adequate cornering force of the front wheels 10 and 11 is ensured by way of the acceleration-turning E-TS control executed by the E-TS control section 18a, whereas adequate cornering force of the outer wheel of the rear-left and rear-right wheels 5 and 6 is ensured by way of the acceleration-turning A-LSD control executed by the A-LSD control section 18b. Owing to the adequate cornering forces at the front wheel side and the rear wheel side during acceleration-turning, positive and negative fluctuations in yawing moment of the vehicle are minimized and thus the vehicle can turn substantially in neutral steer region. Even during acceleration-turning, the cornering stability can be enhanced by way of an integrated control of the system made according to the invention. As explained above, it will be appreciated that the E-TS control and the A-LSD control are optimally correlated or linked to each other in the integrated system of the invention.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

Although the differential limiting torque control system including the A-LSD control section 18b and the A-LSD control valve 17 is exemplified as the right-and-left driving-torque distribution control system in the preferred embodiment, the right-and-left driving-torque distribution control system may comprise a braking-force (regarded as a negative driving force) control system which can control braking forces created at right and left wheels independently of each other.

Furthermore, although the integrated control system of the invention is applied to four-wheel drive vehicles which basically operate at a rear-wheel drive mode, the system may be applied to four-wheel drive vehicles which basically operate at a front-wheel drive mode.

What is claimed is:

1. An integrated driving-torque distribution control system for a four-wheel drive vehicle, for controlling a driving torque distribution between front and rear wheels and a driving torque distribution between right and left wheels, comprising:

first torque distribution control means responsive to a first control command for controlling a front-and-rear driving torque distribution between subsidiary drive wheels installed at a first side of front and rear sides of the vehicle and primary drive wheels installed at a second side of the front and rear sides;

second torque distribution control means responsive to a second control command for controlling a right-and-left driving torque distribution between said primary drive wheels;

first target slip arithmetic means for deriving a target slip state of said subsidiary drive wheels, in which state a cornering force applied to said subsidiary drive wheels is maintained at a predetermined high level;

first actual slip arithmetic means for deriving an actual slip state of said subsidiary drive wheels;

second target slip arithmetic means for deriving a target slip state of an outer wheel of said primary driven wheels during turning of the vehicle, in which state a cornering force applied to said outer wheel is maintained at a predetermined high level;

second actual slip arithmetic means for deriving an actual slip state of said outer wheel;

decision means for deciding whether the vehicle is in an acceleration-turning state; and integrated control means for maintaining both said cornering force applied to said subsidiary drive wheels and said cornering force applied to said outer wheel at said predetermined high level when the vehicle is in the acceleration-turning state and said actual slip state of said subsidiary drive wheels exceeds said target slip state, by simultaneously controlling said first and second torque distribution control means to adjust said actual slip state of said subsidiary drive wheels toward said target slip state of said subsidiary drive wheels in response to said first control command and to adjust said actual slip state of said outer wheel toward said target slip state of said outer wheel in response to said second control command as long as said first control command is output.

2. The integrated control system as set forth in claim 1, which further comprises vehicle-speed arithmetic means for estimating a vehicle speed every predetermined time interval, and for setting a current estimate of the vehicle speed during acceleration of the vehicle by adding an integral of a longitudinal acceleration exerted on the vehicle to a previous estimate of the vehicle speed being estimated prior to a current time interval, said first and second actual slip arithmetic means deriving said actual slip state of said subsidiary drive wheels and said actual slip state of said outer wheel, respectively, on the basis of the estimate of the vehicle speed.

3. The integrated control system as set forth in claim 2, wherein said actual slip state of said subsidiary drive wheels is defined as an actual slip ratio calculated by dividing a difference between a wheel speed of said subsidiary drive wheels and the estimate of the vehicle speed by said wheel speed of said subsidiary drive wheels, and said target slip state of said subsidiary drive wheels is defined as a target slip ratio, and said first target slip arithmetic means derives said target slip ratio of said subsidiary drive wheels on the basis of a lateral acceleration exerted on the vehicle, to set said target slip ratio at a greater value when the lateral acceleration is maintained within a low lateral acceleration range, and to set said target slip ratio at a smaller value when the lateral acceleration is maintained within a high lateral acceleration range.

4. The integrated control system as set forth in claim 3, wherein said first target slip arithmetic means further compensates said target slip ratio based on the lateral acceleration on the basis of the estimate of the vehicle speed, so that said target slip ratio increases when the estimate of the vehicle speed is maintained within a low-speed range.

5. An integrated driving-torque distribution control system for a four-wheel drive vehicle equipped with an electronically controlled torque-split transfer and an active limited slip differential, for controlling a driving torque distribution between front and rear wheels and a driving torque distribution between right and left wheels, comprising:

front-and-rear torque distribution control means connected to said torque-split transfer and responsive to a first control command for controlling a front-and-rear driving torque distribution between front drive wheels and rear drive wheels;

right-and-left torque distribution control means connected to said active limited slip differential and responsive to a second control command for controlling a right-and-left driving torque distribution between said rear drive wheels;

first target slip arithmetic means for deriving a target slip state of said front drive wheels, in which state a cornering force applied to said front drive wheels is maintained at a predetermined high level;

first actual slip arithmetic means for deriving an actual slip state of said front drive wheels;

second target slip arithmetic means for deriving a target slip state of an outer wheel of said rear drive wheels during turning of the vehicle, in which state a cornering force applied to said outer wheel is maintained at a predetermined high level;

second actual slip arithmetic means for deriving an actual slip state of said outer wheel;

decision means for deciding whether the vehicle is in an acceleration-turning state; and integrated control means for maintaining both said cornering force applied to said front drive wheels and said cornering force applied to said outer wheel at said predetermined high level when the vehicle is in the acceleration-turning state and said actual slip state of said front drive wheels exceeds said target slip state, by simultaneously controlling said front-and-rear and right-and-left torque distribution control means to adjust said actual slip state of said front drive wheels toward said target slip state of said front drive wheels in response to said first control command and to adjust said actual slip state of said outer wheel toward said target slip state of said outer wheel in response to said second control command as long as said first control command is output.

* * * * *